United States Patent
Fauran et al.

[11] 3,878,207
[45] Apr. 15, 1975

[54] NOVEL AMINE DERIVATIVES OF 4,8 DIMETHOXY FURO (3',2'-f) BENZOXAZOLE

[75] Inventors: Claude P. Fauran, Paris; Jeannine A. Eberle, Chatou; Guy M. Raynaud, Paris; Yves J. Bailly, Nanterre, all of France

[73] Assignee: Delalande S.A., Courbevoie, France

[22] Filed: Oct. 11, 1973

[21] Appl. No.: 405,650

[52] U.S. Cl. .................... 260/247.5 EP; 260/293.58; 260/307 D; 260/346.2 R; 424/248; 424/267; 424/272
[51] Int. Cl. ............................................. C07d 85/48
[58] Field of Search... 260/247.5 EP, 293.58, 307 D

[56] References Cited
UNITED STATES PATENTS
3,553,228   1/1971   Freedman ................. 260/247.5 EP OTHER PUBLICATIONS
Demerseman et al., C.A., Vol. 72, No. 43539.

Primary Examiner—Lorraine A. Weinberger
Assistant Examiner—Richard D. Kelly
Attorney, Agent, or Firm—Woodhams, Blanchard and Flynn

[57] ABSTRACT
Compounds of the formula

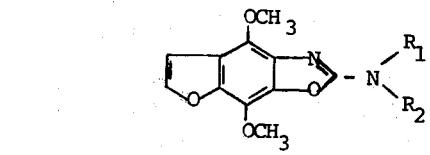

wherein

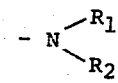

is propylamino, phenylamino, dimethylamino, pyrrolidino, piperidino or morpholino. The compounds are prepared by reacting 4,8-dimethoxy-2-mercapto furo(3',2'-f) benzoxazole with

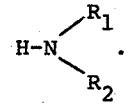

The compounds possess hypnotic, sedative, anticonvulsant, myorelaxant, analgesic, anti-inflammatory, cardiac analeptic, vasodilatatory, diuretic and anti-ulcerous properties.

8 Claims, No Drawings

NOVEL AMINE DERIVATIVES OF 4,8 DIMETHOXY FURO (3',2'-f) BENZOXAZOLE

The present invention relates to novel amine derivatives of 4,8-dimethoxy furo (3',2'-f)benzoxazole.

The novel compounds prepared according to the invention correspond to the formula:

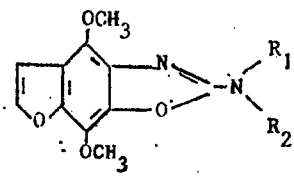

(I)

in which the group

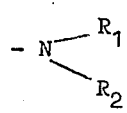

represents:
- a propylamino, phenylamino or dimethylamino radical; or
- a pyrrolidino, piperidino or morpholino ring.

The process according to the invention consists in condensing an amine of formula:

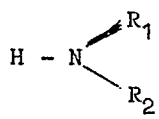

(II)

in which the group -N(R$_1$, R$_2$) has the same significance as in formula (I), with 4,8-dimethoxy-2-mercapto furo (3',2'-f) benzoxazole of formula:

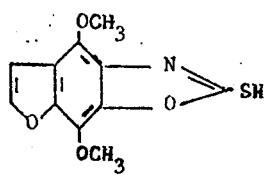

(III)

This compound of formula (III) is itself obtained from khellinone oxime of formula:

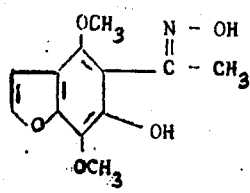

(IV)

To this end, khellinone oxime is subjected to a Beckmann rearrangement and cyclisation by treatment with glacial acetic acid saturated with hydrogen chloride at 90° – 95°C, then by dilution of the reaction mixture with water at 50°C, which leads to the formation of 4,8-dimethoxy-2-methylfuro (3',2'-f)benzoxazole of formula:

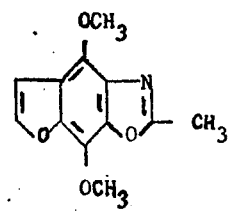

(V)

By hydroxylation of the compound of formula (V) above, there is obtained 5-acetamido-6-hydroxy-4,7-dimethoxy benzofuran of formula:

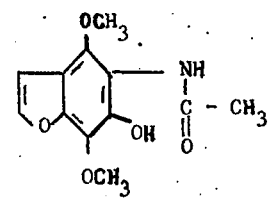

(VI)

which provides, by heating under reflux for 24 hours in ethanolic 2N-hydrochloric acid, 5-amino-6-hydroxy-4,7-dimethoxy benzofuran of formula:

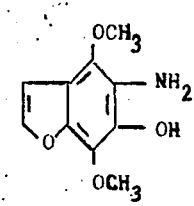

(VII)

Under the action of a mixture of carbon disulphide, methanol and potash, the compound of formula (VII) is converted to the desired compound of formula (III).

The following preparations are given by way of example to illustrate the invention.

EXAMPLE 1

4,8-Dimethoxy-2-pyrrolidino furo (3',2'-f) benzoxazole
(Code No. 7238)

1st stage:
5-Acetamido-6-hydroxy-4,7-dimethoxy benzofuran
(Code No. 70244)

A suspension of 0.2 mol of khellinone oxime in 250 ml acetic acid saturated with hydrogen chloride is heated to 90°–95°C for 15 minutes. The suspension is then diluted with 800 ml of water and the temperature of the reaction mixture is maintained at 50°C for 1 hour. The solution obtained is cooled to 0° – 5°C, filtered and the compound obtained is recrystallized from methanol.

| | | |
|---|---|---|
| Melting point | = | 160°C |
| Yield | = | 75% |
| Empirical formula | = | C$_{12}$ H$_{13}$ N O$_5$ |
| Elementary analysis: | | |

| | C | H | N |
|---|---|---|---|
| Calculated % | 57.37 | 5.22 | 5.88 |
| Found % | 57.15 | 5.17 | 5.69 |

2nd stage:

5-Amino-6-hydroxy-4,7-dimethoxy benzofuran (Code No. 70344)

0.88 mol of 5-acetamido-6-hydroxy-4,7-dimethoxy benzofuran in suspension in 1.75 of ethanolic 2N-hydrochloric acid, is heated under reflux for 24 hours.

The amide is rapidly solubilised and a brown clear solution is obtained. At the end of 24 hours, the solution is diluted with 1 l of water, taken up in ethanol and extracted with ethyl acetate in order to eliminate the amide which has not been reacted.

The solution is neutralised to a pH of 4 by the dropwise addition, with good agitation, of 2N soda. 5-amino-6-hydroxy-4,7-dimethoxy benzofuran is obtained which may be recrystallised from water, but is utilised as such in the next stage.

| Melting point | = | 131°C |
| Yield | = | 80% |
| Empirical formula | = | $C_{10}H_{11}NO_4$ |

Elementary analysis:

| | | C | H | N |
|---|---|---|---|---|
| Calculated | % | 57.41 | 5.30 | 6.70 |
| Found | % | 57.66 | 5.33 | 6.87 |

3rd Stage:

4,8-Dimethoxy-2-mercapto furo(3,2'-f) benzoxazole (Code No. 70376)

0.78 mol of carbon disulphide is added, with agitation, to a solution of 1.44 mol of potash in a mixture of 780 ml of methanol and 140 ml of water. 0.7 mol of 5-amino-6-hydroxy-4,7-dimethoxy benzofuran is then added thereto. The mixture is maintained under reflux for 15 hours, cooled and filtered to yield a slightly insoluble product.

The solution is acidified with 140 ml of acetic acid and a precipitate is obtained which is recrystallised twice from xylene.

| Melting point | = | 220°C |
| Yield | = | 70% |
| Empirical formula | = | $C_{11}H_9NO_4S$ |

Elementary analysis:

| | | C | H | N |
|---|---|---|---|---|
| Calculated | % | 52.58 | 3.61 | 5.58 |
| Found | % | 52.33 | 3.68 | 5.78 |

4th stage:

4,8-Dimethoxy-2-pyrrolidino furo (3',2'-f) benzoxazole

A solution of 0.2 mol of 4,8-dimethoxy-2-mercapto furo (3',2'-f)benzoxazole and 0.4 mol of pyrrolidine in 175 ml of toluene is maintained for 12 hours at 100°C. After cooling, the solution is diluted with 500 ml of ether, a black gum is separated and extracted with 240 ml of 2N HCl. The hydrochloride solution, washed with ether, is alkalinised with 2N soda, and then extracted with ethyl acetate. The solution is washed with water, dried and evaporated. The product obtained is extracted with gasoline C under reflux. The evaporated residue of the solution obtained is recrystallised from 40 ml of ethanol

| Yield | = | 59% |
| Empirical formula | = | $C_{15}H_{16}N_2O_4$ |
| Molecular weight | = | 288.29 |

Elementary analysis:

| | | C | H | N |
|---|---|---|---|---|
| Calculated | % | 62.49 | 5.59 | 9.72 |
| Found | % | 62.62 | 5.46 | 9.92 |

EXAMPLE 2

4,8-Dimethoxy-2-morpholino furo (3',2'-f)benzoxazole (Code No. 71328)

A mixture of 0.04 mol of 4,8-dimethoxy-2-mercapto furo (3',2'-f) benzoxazole, 0.08 mol of morpholine and 35 ml of o-dichlorobenzene is maintained for 4 hours at 100°C. After cooling, 100 ml of ether is added thereto. The unimportant insoluble product is separated, and the solution is extracted with 2N HCl. The hydrochloride solution is washed with ether, alkalinised, and then extracted with ether. On evaporation, the desired product is obtained.

| Yield | = | 59% |
| Empirical formula | = | $C_{15}H_{16}N_2O_5$ |
| Molecular weight | = | 304.29 |

Elementary analysis:

| | | C | H | N |
|---|---|---|---|---|
| Calculated | % | 59.20 | 5.30 | 9.21 |
| Found | % | 59.23 | 5.50 | 9.41 |

The compounds listed in the following Table I have been prepared according to the preceding examples.

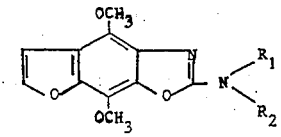

TABLE I

| Code No. | $-N\begin{smallmatrix}R_1\\R_2\end{smallmatrix}$ | Empirical formula | Molecular weight | Melting point °C | Yield % | Calculated C | Calculated H | Calculated N | Found C | Found H | Found N |
|---|---|---|---|---|---|---|---|---|---|---|---|
| 7237 | $-N(CH_3)_2$ | $C_{13}H_{14}N_2O_4$ | 262.26 | 96 | 57 | 59.53 | 5.38 | 10.68 | 59.53 | 5.30 | 10.74 |
| 72120 | piperidino | $C_{16}H_{18}N_2O_4$ | 302.32 | 82 | 31 | 63.56 | 6.00 | 9.27 | 63.49 | 6.09 | 9.48 |
| 71321 | $-NH\text{-}nC_3H_7$ | $C_{14}H_{16}N_2O_4$ | 276.28 | 82 | 25 | 60.86 | 5.84 | 10.14 | 61.05 | 5.85 | 10.22 |
| 71308 | $-NH\text{-}C_6H_5$ | $C_{17}H_{14}N_2O_4$ | 296.29 | 176 | 30 | 65.80 | 4.55 | 9.03 | 66.00 | 4.75 | 8.82 |

The compounds of formula (I) have been studied on animals in the laboratory and have been shown to possess hypnotic, sedative, anticonvulsivant, myorelaxant, analgesic, anti-inflammatory, cardiac analeptic, vasodilatatory, diuretic and anti-ulcerous properties.

1. Hypnotic properties

Administered by oral means to the mouse, the compounds of formula (I) are capable of provoking the loss of righting reflex.

By way of example, the administration of 450 mg/kg/PO of compound No. 7237 provokes a loss of righting reflex of 50 percent in such animals.

2. Sedative properties

The compounds of formula (I), administered by oral means to the mouse, reduce the number of explorations in actimetry with a pencil of rays and with photoelectric cells.

Thus, the number of explorations is reduced by 50 percent following administration of 55 mg/kg/PO of compound No. 7237.

3. Anticonvulsivant and myorelaxant properties

The compounds of formula (I), preventively administered by oral means to the mouse, reduce the mortality provoked by the under-cutaneous injection of cardiazol and strychnine.

In the case of compound No. 7237 for example, a dose of 65 mg/kg/PO assures a 50 percent protection against the lethality of strychnine and a dose of 225 mg/kg/PO assures a 50 percent protection against the lethality of cardiazol.

4. Analgesic properties

The compounds of formula (I), administered by oral means to the mouse, are capable of reducing the number of painful stretchings caused by the intraperitoneal injection of acetic acid.

The results obtained with several compounds are listed in the following Table II.

TABLE II

| Code No. of compound tested | Dose administered | Percentage reduction in number of painful stretchings |
|---|---|---|
| 71328 | 100 mg/kg/PO | 45% |
| 7237 | 85 mg/kg/PO | 50% |
| 72120 | 100 mg/kg/PO | 50% |

5. Anti-inflammatory properties

These properties are shown by a reduction of the underplantary oedema provoked by the local injection of a phlogogenic agent, such as carraghenine, to a rat following the administration of compounds of formula (I).

By way of example, the administration of 100 mg/kg/PO of compound No. 7237 reduces the oedema by 55 percent.

6. Cardiac analeptic properties

These properties are shown by an augmentation of the amplitude of beating (positive inotropic action) on the isolated heart of a guinea pig maintained in a conserving medium and under appropriate experimental conditions.

Thus, a positive inotropic action of 100% is obtained at a concentration of 0.25 $\mu$g/ml for compound No. 7237, and of 0.5 $\mu$g/ml for compound No. 7238.

7. Vasodilatatory properties

The compounds of formula (I) are capable of augmenting the flow of the coronary vessels of the isolated heart of a guinea-pig when said compounds are added to the perfusion liquid of said organ.

By way of example, in a concentration of 0.5 $\mu$g/ml in the perfusion liquid, the compound No. 7238 augments by 45 percent the flow of the coronary vessels.

8. Diuretic properties

The compounds of formula (I), administered by oral means to the mouse simultaneously with a volume of 1ml of an isotonic solution of sodium chloride per 25g of the corporeal weight of the mouse, are capable of provoking an augmentation of the volume of urine emitted by reference to control animals, the volume being measured for 4 hours following administration.

The results obtained with certain of these compounds in an administration dose of 50 mg/kg/PO, are shown in the following Table III:

TABLE III

| Code No. of compound tested | Percentage augmentation of diuresis |
|---|---|
| 71328 | 45% |
| 7237 | 50% |
| 7238 | 60% |
| 72120 | 60% |

9. Anti-ulcerous properties

The compounds of formula (I), administered by intraduodenal means, reduce the extent of gastric ulcers provoked in the rat by tying of the pylorus (Shay ulcers).

Thus, in a dose of 50mg/kg/ID, the compound Nos. 71328 and 72120 reduce the Shay ulcers by 50 percent and by 55 percent respectively.

As can be seen by comparison of the results expressed above and the values shown in the following Table IV, the difference between the pharmacologically-active dose and the lethal dose is sufficiently great to permit the compounds of formula (I) to be utilised in therapeutics.

TABLE IV

| Code No. of compound tested | Dose administered mg/kg/PO | Percentage mortality |
|---|---|---|
| 71328 | 2 000 | 50% |
| 7237 | 3 400 | 50% |
| 7238 | 2 400 | 50% |
| 72120 | 2 000 | 0% |

The compounds of formula (I) are useful in the treatment of insomnia, anxieties, contractures, diverse originating pains, painful inflammations, hypotensions, circulatory insufficiencies, oedemas and gastro-duodenal ulcers.

They may be administered by oral means in the form of tablets, dragees and gelules containing 50 to 500 mg of active ingredient (1 to 5 times a day) and by rectal means in the form of suppositories containing 25 to 300mg of active ingredient (once or twice a day).

Accordingly, the present invention also relates to a therapeutic composition comprising a compound of the general formula (I) together with a therapeutically-acceptable carrier.

What we claim is:
1. A compound of the formula:

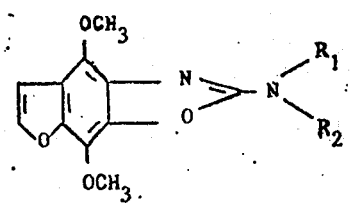

(I)

in which the group

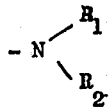

represents:
 a propylamino, phenylamino or dimethylamino radical or
 a pyrrolidino, piperidino or morpholino ring.

2. A process for the preparation of a compound as claimed in claim 1, comprising condensing an amine of formula:

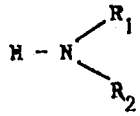

(II)

in which the group - N (R₁, R₂) has the same significance as in formula (I), with 4,8-dimethoxy-2-mercapto furo (3',2'-f) benzoxazole of formula:

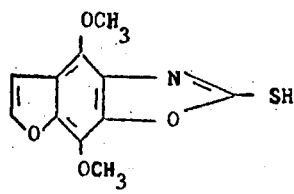

(III)

3. A compound according to claim 1, in which

is propylamino.

4. A compound according to claim 1, in which

is dimethylamino.

5. A compound according to claim 1, in which

is pyrrolidino.

6. A compound according to claim 1, in which

is piperidino.

7. A compound according to claim 1, in which

is morpholino.

8. A compound according to claim 1, in which

is phenylamino.

* * * * *